(12) United States Patent
Yanoff et al.

(10) Patent No.: US 7,507,512 B2
(45) Date of Patent: Mar. 24, 2009

(54) PARTICLE-IN-BINDER X-RAY SENSITIVE COATING USING POLYIMIDE BINDER

(75) Inventors: Brian David Yanoff, Niskayuna, NY (US); Zhaoping Wu, Shanghai (CN); Kun Tao, Shanghai (CN); Yunfeng Sun, Beijing (CN); Jun Xiao, Shanghai (CN); Liping Zheng, Shanghai (CN); Wenqing Peng, Shanghai (CN); Jing Li, Shanghai (CN)

(73) Assignee: General Electric Company, Niskayuna, NY (US)

( * ) Notice: Subject to any disclaimer, the term of this patent is extended or adjusted under 35 U.S.C. 154(b) by 452 days.

(21) Appl. No.: 11/288,554

(22) Filed: Nov. 29, 2005

(65) Prior Publication Data

US 2007/0122543 A1    May 31, 2007

(51) Int. Cl.
*G03G 5/00* (2006.01)
*C09K 11/00* (2006.01)

(52) U.S. Cl. ............... 430/96; 250/370.09; 252/301.36; 378/28; 378/31; 378/62

(58) Field of Classification Search ............ 252/301.36; 250/370.09; 378/28, 31, 62; 430/96
See application file for complete search history.

(56) References Cited

U.S. PATENT DOCUMENTS

| 4,233,514 A | 11/1980 | Kingsley | 250/370 |
| 4,971,873 A * | 11/1990 | Pavlisko et al. | 430/59.6 |
| 5,661,309 A | 8/1997 | Jeromin et al. | 250/580 |
| 5,729,021 A | 3/1998 | Brauers et al. | 250/370.09 |
| 6,128,362 A | 10/2000 | Brauers et al. | 378/28 |
| 6,507,026 B2 | 1/2003 | Ikeda et al. | 250/370.09 |
| 2001/0008271 A1 | 7/2001 | Ikeda et al. | 250/370.09 |
| 2001/0010361 A1 | 8/2001 | Izumi et al. | 250/370.08 |
| 2004/0051047 A1 | 3/2004 | Arakawa | 250/370.12 |

FOREIGN PATENT DOCUMENTS

| EP | 0777868 B1 | 10/1999 |
| EP | 1400817 A1 | 3/2004 |
| WO | WO02/067014 A1 | 8/2002 |
| WO | WO02/103388 A2 | 12/2002 |
| WO | WO02/103389 A2 | 12/2002 |

OTHER PUBLICATIONS

J. Moreau, Radiophotoconductivite de couches epaisses composites a base d'oxyde de plomb : influence des traitements thermiques, mechaniques et du dopage, Physics Abstracts, 72.40-81.20T.

* cited by examiner

*Primary Examiner*—Amanda C. Walke
(74) *Attorney, Agent, or Firm*—Eileen W. Gallagher

(57) ABSTRACT

An X-ray sensitive coating (22) for a flat panel direct conversion X-ray detector for medical or industrial imaging. A composite particle-in-binder (PIB) material (22) may contain X-ray photoconductive particles (23) such as PbO (lead monoxide) in a binder of polyimide (23). This PIB material may be prepared in precursor paste form, and applied as a coating (22) onto a thin film transistor array (26) having a storage capacitor (31) at each pixel (30). The coating (22) is cured, and an electrically conducting layer (34) is applied to the exposed surface of the coating (22), to provide a bias voltage. X-ray photons striking the photoconductive particles (23) cause localized electrical conduction proportional to the number of photons. This charges respective capacitors (31) that provide image data input to a computer.

16 Claims, 2 Drawing Sheets

PARTICLE-IN-BINDER X-RAY SENSITIVE COATING USING POLYIMIDE BINDER

FIELD OF THE INVENTION

This invention is generally in the field of direct conversion X-ray imaging, and, more particularly, X-ray sensitive coatings, such as may be used in flat panel direct conversion X-ray detectors for medical and industrial imaging.

BACKGROUND OF THE INVENTION

X-ray sensitive coatings for direct conversion X-ray imaging have been made of various photoconductor materials that normally behave as insulators, but upon impingement of X-ray photons directly form an electrical charge without use of intermediary converting materials. A thin film transistor (TFT) array provides electrical charge signals from each of a plurality of pixels to a computer. Prior photoconductor materials and binders used in detectors for direct conversion X-ray imaging have suffered from various disadvantages. Amorphous selenium (a-Se) has relatively low stopping power for X-rays having energy levels approximately above 30 kVp, and in addition incurs incremental costs due to vacuum vapor deposition of Se. $HgI_2$ particle-in-binder (PIB) materials tend to be highly reactive and chemically unstable. Epoxy binders are generally not compatible with PbO, due to polar hydroxyl groups present on the surface of typical PbO particles. Epoxy binders are also unstable against radiation damage, and allow high leakage currents. Organic semiconductor binders allow leakage currents that are orders of magnitude too high for practical applications, especially for medical imaging.

BRIEF DESCRIPTION OF THE DRAWINGS

The invention is explained in the detailed description below together with the following drawings wherein.

DETAILED DESCRIPTION OF THE INVENTION

Figure 1:
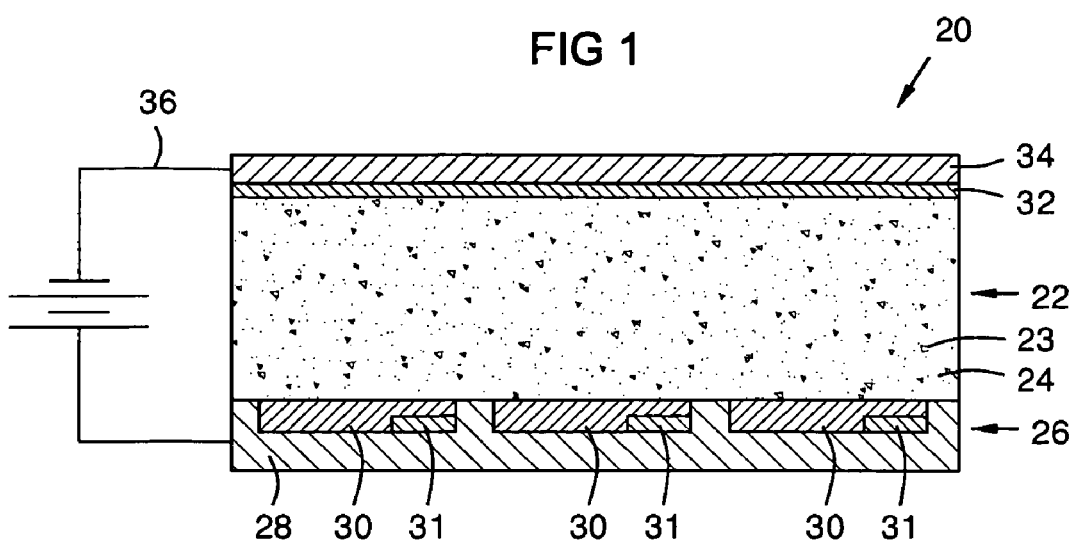
FIG. 1 is a schematic sectional view of an exemplary flat panel direct conversion X-ray detector according to aspects of the invention.

FIG. 1 illustrates an exemplary flat panel direct conversion X-ray detector according to aspects of the present invention. A thin film transistor (TFT) array 26 comprises a plurality of pixel elements 30 in a substrate 28. Each pixel element 30 may comprise a collector plate, a transistor, and a storage capacitor 31, and may be electrically coupled to a gate line and a data line. The data line may be coupled to an A/D converter to supply digitized data to a computer or processor for image data input, analysis, storage, and display, each of which is well-understood in the art. For readers desirous of general background information, reference is made to a paper titled "Direct-Conversion Flat-Panel X-Ray Image Sensors For Digital Radiography" by S. O. Kasap and J. A. Rowlands, published in Proceedings of the IEEE, Vol. 90, No. 4, April 2002, which paper is herein incorporated by reference in its entirety.

An X-ray sensitive layer 22 is formed as a coating on the TFT array, and may comprise X-ray sensitive particles 23 disposed in a polyimide binder 24 according to aspects of the invention. This type of composite material is referred throughout this document as a particle-in-binder material or PIB. An electrically conducting layer 34 is applied to the PIB surface opposite the TFT array 26. In operation, a bias voltage is applied to the electrically conducting layer 34, creating an electric field within the X-ray sensitive layer 22. The PIB layer 22 is normally an insulator, but when X-ray photons strike a particle 23, the particle releases electron/hole pairs (EHPs), the number of which is in proportion to the energy transferred to the particle from the X-ray photons. The electric field in the X-ray sensitive film 22, causes the holes to move to the top electrical conducting layer, and the electrons to move to the storage capacitor. This causes storage capacitor 31 to become electrically charged, and generates a proportional voltage signal on the data line when the pixel is polled by the gate line, as known in the art.

As will be recognized by those skilled in the art, a polyimide is any of a group of high polymers that comprise an imide group in the polymer chain. A representative structure of an imide is illustrated below.

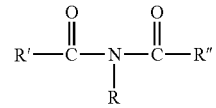

Figure 2:
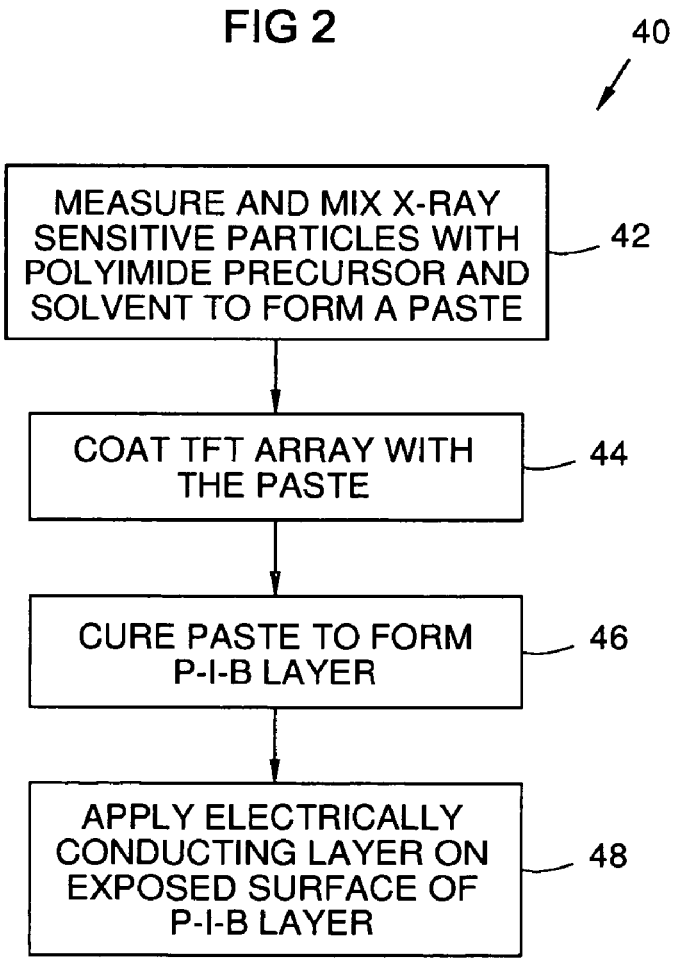
FIG. 2 is an exemplary process flow chart as may be used for fabricating a flat panel X-ray detector as shown in FIG. 1.

FIG. 2 is a flow chart 40 depicting exemplary steps as may be used for fabricating an X-ray detector panel according to aspects of the present invention. As shown at block 42, a paste is formed from X-ray sensitive particles 23, such as PbO (lead monoxide) powder mixed with a polyimide precursor, which, for example, may comprise a polyamic acid solution in a solvent such as N-Methyl-2-Pyrrolidone (NMP), Dimethylacetamide (DMAC), or Xylene. As shown at block 44, this paste may be applied onto a TFT array, such as by stencil printing, screen printing, or any other suitable coating process to form a thick film.

For X-ray imaging applications, the film thickness is determined in part by the absorption of X-ray radiation by the film. Films of several hundred micrometers are suitable for most medical imaging applications. Films in the order of millimeters or more could be used for applications requiring detection of very high energy X-rays. The thick film may be allowed to settle for a period of time at a room temperature to become smooth. The film may then be heat cured to imidize the precursor, as shown at block 46. This produces a composite material 22 of X-ray sensitive particles 23 bound in a polyimide matrix 23.

As shown at block 48, a uniform electrical contact layer 34 may then be applied to the exposed surface of the composite sensing layer 22, such as by sputtering or any other suitable depositing means. The contact layer 34 may be formed of a metal or other electrically conductive material as known in the art. Exemplary materials for the electrical contact may be platinum, silver and aluminum. It will be appreciated, however, that various other metals or alloys may be used.

An intermediate passivation layer 32 may be applied to the exposed surface of the PIB layer 22 prior to applying the contact layer, such as to seal and reinforce the PIB layer 22. The passivation layer 32 may be made of sealants such as silicone, polyimide, parylene, epoxy, acrylic, polyurethane or any suitable conformal coating and, for example, may be applied by application processes, such as spin coating, meniscus coating, spray coating, screen printing, etc. It is also contemplated that it is possible to deposit SiNx or SiOx by plasma method, for example, on the PIB layer 22 as passivation layer 32.

The X-ray sensitive particles may comprise PbO (lead monoxide), CZT (cadmium zinc telluride), $HgI_2$ (mercuric iodide), $PbI_2$ (lead iodide), or TlBr (thalium bromide), or other photoconductor material, that produces electrical charges upon absorption of X-ray photons. A preferred particle material is red PbO with tetragonal crystal structure. The yellow phase of PbO, which has an orthorhombic crystal structure, appears to be less sensitive to X-rays because of its larger band gap. An exemplary particle size may comprise a generally random distribution of sizes from approximately 30 nanometers to approximately 80 microns. A Tyler mesh size of 300 or higher (e.g., 400 mesh size) may be used in a sieve to remove larger particle sizes.

Figure 3:
FIG. 3 is a micro-photographic edge view of a particle-in-binder (PIB) coating according to aspects of the invention.
Figure 4:
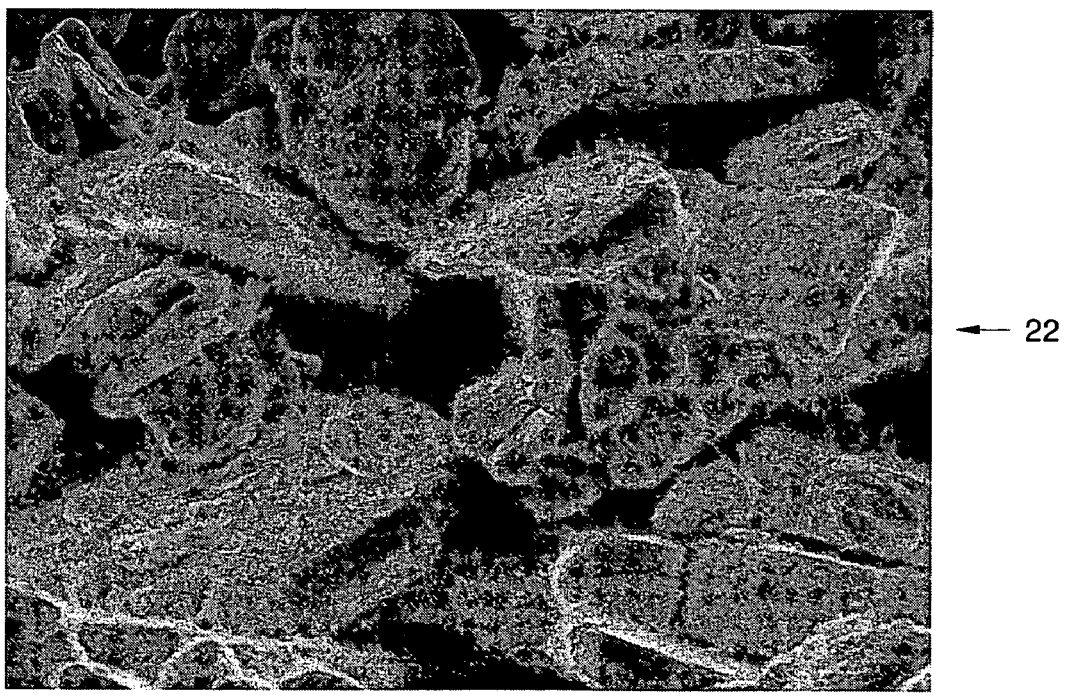
FIG. 4 is a micro-photographic view of particles in a sparse fibrous polyimide binder according to aspects of the invention.

An exemplary particle shape is generally plate-shaped, comprising a short thickness dimension relative to the length and width dimensions, which may or may not be the same. Typical particle thickness may be approximately 2 microns. This shape may be irregular and/or smooth, and may be produced by any known particle manufacturing process. In one exemplary embodiment, the particles should be red phase PbO having a tetragonal crystal structure and should have a purity of approximately 99.99% or higher, e.g., approximately 99.999%. FIGS. 3 and 4 show exemplary particle shapes as tested.

The ratio of polyimide precursor to particles in the mixture may be selected for a desirable paste viscosity and cured performance properties. It was found experimentally that a ratio range from about 10 parts to about 100 parts of particles to about 1 part of precursor by weight in the uncured film provides acceptable paste viscosities and cured properties. A second exemplary ratio range of particles to polyimide precursor is approximately from about 30 parts to about 50 parts of particles to 1 part of polyimide precursor by weight. A ratio of about 50:1 by weight was found to provide superior performance in an exemplary embodiment. These dense mixtures cause the precursor to imidize into a sparse fibrous matrix of polyimide, resulting in a porous cured material as seen in FIGS. 3 and 4. Porosity of exemplary prototype samples may be approximately 20% by volume (i.e., approximately 20% of the material by volume is empty space). It is contemplated that an exemplary porosity range for the matrix may be from approximately 5% to approximately 30% by volume.

In at least one exemplary method of producing this structure it is believed that the polyimide is able to at least partially passivate the surface states on the surface of the PbO particles. This reduces the leakage current by reducing the thermal generation of charges from these states and increases the X-ray sensitivity of the material by reducing the rate for trapping and recombination of X-ray generated charges. This relatively high density makes the PIB material more uniform vertically than with a less dense mixture, because it reduces the sinking of the powder before hardening. It was found that humidity during curing is beneficial. Water (or alcohol) causes the precursor to precipitate from the solvent, hastening imidization, and reducing sinking of the powder. To this end, it was found that submerging the coating in water for about 5 minutes (or alcohol for about 30 minutes) soon after coating and before the curing stage was beneficial, because such pre-precipitating of polyimide precursor prevents the precursor from evaporation or release from the film together with the solvent during curing stage. Therefore, more polyimide remains in the film after curing, which reduces the leakage current in the final product.

To produce a film with the desired microstructure and continuous phase of polyimide, the following exemplary steps may be followed: The polyimide precursor (e.g., polyamic acid) is diluted in a solvent, such as NMP so that the final paste (including PbO powder) has the desired viscosity suitable for screen printing. The ratio of precursor to solvent may typically range from approximately 1:12 to approximately 1:5. The PbO powder is added to the binder and mixed for at least several seconds up to approximately 2 minutes using, for example, a SpeedMixer automatic mixing machine (FlakTek Inc., Landrum S.C., USA). The paste is coated onto a TFT array, (e.g., using standard screen printing techniques) in an automatic screen printing machine (Speedline Technologies Inc, Franklin, Mass., USA). After printing the film is allowed to sit at room temperature for several minutes to level. Next the film is lowered into a bath of methyl alcohol and allowed to soak there for up to 30 minutes. The substrate is transferred to an oven for curing. The film is cured at 120 C. for 2 hours to drive off the solvent, then at 240 C. for 5 hours to complete the imidization of the binder. The film is then allowed to cool to room temperature in the oven.

X-ray sensitive coatings made according to aspects of the invention use relatively inexpensive raw materials. Standard screen printing equipment can be used to apply the coating, which is presently about one tenth as inexpensive relative to vacuum deposition equipment required for photodiode fabrication and deposition of a scintillator such as CsI (cesium iodide). It will be appreciated that TFT arrays embodying aspects of the invention can be made by standard processes, such as may be used for liquid crystal displays, since photodiodes are not required as with scintillator coatings. One exemplary embodiment using a ratio of PbO to polyimide precursor of approximately 50:1, a PIB layer thickness of about 300 microns, and approximately 5 minutes of water treatment (or approximately 30 minutes of alcohol treatment) was experimentally shown to have improved sensitivity and leakage current compared with the results of Morreau et al (Revue Phys Appl 25 (1990) 799) on PbO PIB materials using epoxy binders. In particular, sensitivity is approximately 3 times higher at similar levels of leakage current.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An X-ray sensitive coating comprising:
a plurality of particles comprising a photoconductor material that releases electron/hole pairs upon absorption of X-ray photons;
a binder comprising a polyimide for binding the plurality of particles to form a composite particle-in-binder (PIB) material; and
wherein the binder comprises a sparse fibrous microstructure with a porosity that ranges from approximately 5% to approximately 30% by volume.

2. An X-ray sensitive coating as in claim 1, wherein the photoconductor material comprises PbO.

3. An X-ray sensitive coating as in claim 2, wherein the photoconductor material comprises red phase PbO having a tetragonal crystal structure.

4. An X-ray sensitive coating as in claim 3, wherein the purity of the red phase PbO is at least 99.99%.

5. An X-ray sensitive coating as in claim 4, wherein the purity of the red phase is about 99.999%.

6. An X-ray sensitive coating as in claim 1, wherein the polyimide forms a continuous phase for preventing direct physical contact between the plurality of particles.

7. An X-ray sensitive coating as in claim 1, wherein at least most of the particles are formed in a generally plate-like shape, said shape having a short thickness dimension relative to its length and width dimensions.

8. An X-ray sensitive coating as in claim 1, wherein the porosity has a value of approximately 20% by volume.

9. An X-ray sensitive coating as in claim 1, wherein the particle-in-binder material forms a sensing layer comprising an outer surface, and further comprising a passivation layer on the outer surface that seals and reinforces the sensing layer.

10. An X-ray sensitive coating as in claim 9, wherein the passivation layer is selected from the group consisting of a silicone, a polyimide, parylene, an epoxy, acrylic, polyurethane, SiNx and SiOx.

11. An X-ray sensitive coating as in claim 1, wherein the particles are filtered with a screen having a Tyler mesh size number ranging from 200 to 400.

12. An X-ray sensitive coating as in claim 1, wherein the particles comprise a variety of particle sizes up to about 80 microns.

13. An X-ray sensitive coating as in claim 1, further comprising a thin film transistor array of pixels, each comprising a storage capacitor, wherein the coating is applied to a surface of the array, and a continuous electrode is applied to a surface of the coating.

14. An X-ray sensitive coating as in claim 1, wherein the material is selected from the group consisting of PbO, CZT, $HgI_2$, $PbI_2$, and TIBr.

15. An X-ray sensitive coating as in claim 1 wherein the particles are generally plate-shaped in a variety of sizes up to about 80 microns in a maximum dimension; the particle-in-binder material has a ratio from about 10 parts to about 100 parts of particles to about 1 part polyimide precursor by weight; the polyimide forms a sparse matrix so that the particle-in-binder material has a porosity that ranges from approximately 5% to approximately 30% by volume; the particle-in-binder material is applied to a TFT array, forming a PIB layer of a desired thickness; and an electrically conductive layer is applied to the PIB layer opposite the TFT array.

16. An X-ray sensitive coating as in claim 1, wherein the ratio of particles to polyimide precursor is approximately from about 30 parts to about 50 parts of particles to 1 part of polyimide precursor by weight.

* * * * *